(12) United States Patent
Tourian et al.

(10) Patent No.: US 12,449,553 B2
(45) Date of Patent: Oct. 21, 2025

(54) METHOD FOR DETECTING THE PRESENCE OF INTERFERENCE DURING GNSS-BASED AND INS-BASED LOCALIZATION OF A VEHICLE

(71) Applicant: Robert Bosch GmbH, Stuttgart (DE)

(72) Inventors: Mohammad Tourian, Stuttgart (DE); Jens Strobel, Freiberg am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 495 days.

(21) Appl. No.: 17/814,065

(22) Filed: Jul. 21, 2022

(65) Prior Publication Data

US 2023/0025795 A1 Jan. 26, 2023

(30) Foreign Application Priority Data

Jul. 22, 2021 (DE) ...................... 10 2021 207 878.8

(51) Int. Cl.
*G01S 19/49* (2010.01)
*G01S 19/21* (2010.01)
*G01S 19/47* (2010.01)
*G01S 19/22* (2010.01)
*G01S 19/40* (2010.01)

(52) U.S. Cl.
CPC .............. *G01S 19/49* (2013.01); *G01S 19/21* (2013.01); *G01S 19/47* (2013.01); *G01S 19/22* (2013.01); *G01S 19/40* (2013.01)

(58) Field of Classification Search
CPC ........ G01S 19/21; G01S 19/49; G01S 19/396; G01S 19/393; G01S 19/215; G01S 19/22; G01S 19/40; G01S 19/47

USPC .............. 342/357.32, 357.23, 357.22, 357.3, 342/357.59, 357.61
See application file for complete search history.

(56) References Cited

U.S. PATENT DOCUMENTS

| | | | | |
|---|---|---|---|---|
| 6,560,535 B2 * | 5/2003 | Levy | ...................... | G01S 19/071 701/470 |
| 7,702,459 B2 * | 4/2010 | Hoshizaki | ............... | G01S 19/47 701/472 |
| 9,026,362 B2 * | 5/2015 | Sanjay | .................... | G01S 19/05 701/400 |
| 11,733,392 B2 * | 8/2023 | Metzger | .................. | G01S 19/31 342/352 |
| 12,320,902 B2 * | 6/2025 | Clausen | ................ | G01S 19/215 |

(Continued)

FOREIGN PATENT DOCUMENTS

| | | | | |
|---|---|---|---|---|
| CN | 102914785 A | * | 2/2013 | ............. G01C 21/28 |
| CN | 113805214 A | * | 12/2021 | ............. G01S 19/49 |

(Continued)

*Primary Examiner* — Chuong P Nguyen
(74) *Attorney, Agent, or Firm* — Maginot, Moore & Beck LLP

(57) ABSTRACT

A method for detecting a presence of interference during global navigation satellite system (GNSS)-based and inertial sensor signals (INS)-based localization of a vehicle includes determining localization results using a first filter configured to read in GNSS data and INS data, and storing a plurality of the determined localization results. The plurality of the determined localization results are after one another in terms of time and are each determined using the first filter. The method further includes analyzing the stored plurality of localization results using a second filter which differs from the first filter.

13 Claims, 3 Drawing Sheets

(56) References Cited

U.S. PATENT DOCUMENTS

2017/0082757 A1* 3/2017 Kunkel .................. G01S 19/49
2024/0167824 A1* 5/2024 Gabb .................. B60W 50/029

FOREIGN PATENT DOCUMENTS

EP 3828583 A1 * 6/2021 ........... G01C 21/165
EP 3963286 B1 * 5/2024 ............. G01S 19/20

* cited by examiner

METHOD FOR DETECTING THE PRESENCE OF INTERFERENCE DURING GNSS-BASED AND INS-BASED LOCALIZATION OF A VEHICLE

This application claims priority under 35 U.S.C. § 119 to patent application no. DE 10 2021 207 878.8, filed on Jul. 22, 2021 in Germany, the disclosure of which is incorporated herein by reference in its entirety.

The disclosure relates to a method for detecting the presence of interference during GNSS-based and INS-based localization of a vehicle. A computer program, a machine-readable storage medium and a localization device for a vehicle are also specified. The disclosure can be used, in particular, in GNSS-based and INS-based localization systems for autonomous or partially autonomous driving.

BACKGROUND

A global navigation satellite system (GNSS for short) makes it possible to determine a geospatial position on Earth. The GNSS satellites circulate the Earth and emit coded GNSS signals, on the basis of which a GNSS-based localization system can determine the distances between the localization system and the respective GNSS satellites by determining the time difference between the reception time and the transmission time. The estimated distances are used to estimate the position of the receiver if sufficient GNSS satellites are tracked (typically more than 5). Currently, more than 130 GNSS satellites circulate the Earth. This means that at most 65 GNSS satellites can usually be tracked on the local horizon.

A GNSS-based and INS-based localization system can advantageously achieve a positioning accuracy in the centimeter range by using the GNSS quad-constellation, triple frequency, external atmospheric restrictions and PPP authentication by the user and with the aid of the ambiguity resolution.

Although modern GNSS-based and INS-based localization systems are equipped with various error avoidance algorithms, multi-path reception of GNSS signals, as the main positioning error in GNSS-based and INS-based localization, remains a problem. Multi-path reception occurs if a GNSS signal arrives at the GNSS antenna of the localization system via different paths. The main cause is that the GNSS signal can be reflected by objects which are, in particular, in the vicinity of the GNSS antenna, in particular if the GNSS signal comes from a GNSS satellite at a low elevation.

This error is different for different frequencies. It affects both the phase measurements and the code measurements. In the case of the code, the error may reach a theoretical value of 1.5 times the wavelength ("chip"). This means that, for example, the error in the GPS C1 code may reach a value of 450 meters, even though the value of more than 15 meters can be considered serious. Typically, there are fewer than 2 or 3 meters.

A conventional example of multi-path reception scenarios is that a vehicle drives under an obstacle, for example under an overhead sign. In this scenario, a GNSS signal can be reflected by the overhead sign and the reflected signal is received in this manner by the GNSS antenna. In such a scenario, the incorrect multi-path signal results in incorrect positioning, with the result that a vehicle being navigated opts for the highway exit only very late, for example, which can result in a sudden change of course. Multi-path reception in other scenarios may likewise result in the sudden change in the direction of travel, which should fundamentally be avoided in the interests of traffic safety.

SUMMARY

A new possible way of detecting the presence of interference during GNSS-based and INS-based localization, in particular in good time, is described here in order to be able to avoid, if possible, sudden localization changes and therefore possibly changes in the direction of travel, in particular.

A method for detecting the presence of interference during GNSS-based and INS-based localization of a vehicle, comprising at least the following steps of: a) determining localization results by means of a first filter which reads in GNSS data and INS data, b) storing a plurality of localization results which are after one another in terms of time and are each determined according to step a), c) analyzing localization results stored in step b) by means of a second filter which differs from the first filter.

In order to carry out the method, steps a), b) and c) can be carried out at least once and/or repeatedly in the stated order, for example. Furthermore, steps a), b) and c), in particular steps a) and b), can be at least partially carried out in a parallel manner or at the same time.

The described method is suitable, in particular, for autonomous driving. It is particularly advantageous if an autonomously driving motor vehicle is equipped with a GNSS-based and INS-based localization system for carrying out the described method. The vehicle may be, for example, an automobile which is configured for an at least partially automated or autonomous driving mode.

In contrast to system noise (which can be fundamentally observed during GNSS reception), interference here means, in particular, a detectable (external) influence which may be unexpectedly and suddenly present (based on the vehicle). Such interference is, for example, the multi-path reception or spoofing of navigation satellite signals. Such interference is usually not distributed, like white noise, according to a Gaussian normal distribution and is therefore normally not taken into account by a conventional filter. This is because a Kalman filter, for example, can normally effectively estimate only the system states with uncertainties with a (Gaussian) normal distribution.

GNSS-based and INS-based localization here means, in particular, the positioning and/or navigation of a vehicle, which is driving in an at least partially automated or autonomous manner, in particular, by receiving navigation satellite signals (GNSS signals for short) and inertial sensor signals (INS signals for short).

A GNSS signal is a signal which is transmitted by a navigation satellite and comprises the position information of the navigation satellite and the time information. The position of the vehicle can be determined by receiving at least four GNSS signals from four different navigation satellites of the same global navigation system by means of a GNSS antenna. In this case, the GNSS data are generally the binary form of the GNSS signal. GPS, GLONASS, Galileo and/or Beidou come into consideration as the GNSS service, for example.

An INS signal is a signal which is transmitted by an inertial sensor and comprises an item of acceleration information and/or an item of rate-of-rotation information. At least one rate-of-rotation sensor and at least one acceleration sensor will normally be arranged at the center of mass of the vehicle and advantageously in the direction of the longitudinal axis, the transverse axis and the vertical axis in each case. The acceleration and the rate of rotation of the vehicle with respect to the respective axes can therefore be advantageously captured as raw information in the form of INS signals. Together with the time information contained in the GNSS signal, the pose can be determined in a particularly advantageous manner on the basis of the rate-of-rotation information and the speed can be determined in a particularly advantageous manner on the basis of the acceleration information. In this case, the pose also describes, in particular, at least the tilting (movement about the longitudinal axis), the pitching (movement about the transverse axis) and the yawing (movement about the vertical axis) of the vehicle. The INS data are generally the binary form of the INS signal.

The above-mentioned GNSS and INS signals can be input to the first filter in the form of GNSS and INS data in step a). The first filter comprises an algorithm which can determine the position, the orientation and/or the speed (pose) of the vehicle on the basis of the satellite position information and time information contained in the GNSS signals and on the basis of the acceleration information and rate-of-rotation information contained in the INS signals. The determined position, orientation and/or speed is/are output by the first filter as localization results.

The first filter can be used to determine the localization results taking into account the uncertainties with a (Gaussian) normal distribution, for example white noise and/or offset of the respective inertial sensors.

The interference which generally does not have a (Gaussian) normal distribution, for instance multi-path reception, is not taken into account by the first filter, in particular. In other words, this means, in particular, that the localization results which are determined by the first filter on the basis of GNSS and INS signals captured in real time may be incorrect on account of possible interference which does not have a (Gaussian) normal distribution.

In particular, in order to detect the localization results which are possibly incorrect, the results determined by the first filter may be additionally monitored by a second filter and, if necessary, may be corrected on the basis of past raw or determined data.

For this purpose, the localization results determined in step a) may be initially stored in an additional memory in step b), in particular. In this case, the determined position, the determined orientation and/or the determined speed (pose) may be, as the respective localization results, discrete values which are substantially determined in succession over time and can be stored in the memory in succession. Each localization result—for example the position—can therefore be stored in the form of a multiplicity of position values (x, y, z), such as particles, in the memory. The orientation and/or the speed can be accordingly stored in the same manner.

It can be discerned from this, in particular, that the stored localization results can be used, substantially as temporally past localization results, to correct the currently or subsequently determined localization results. It is particularly preferred if the localization results determined in the last twenty to thirty seconds, for example, are stored.

In step c), localization results stored in step b) are analyzed by means of a second filter which differs from the first filter. In this case, the previously stored localization results can be analyzed by means of a second filter, in particular in conjunction with previously and/or currently captured raw INS data, in order to detect the presence of interference or to correct the currently determined localization results.

In contrast to the second filter, the first filter is generally an algorithm which substantially determines the current results on the basis of the currently captured data. In contrast, the second filter is generally an algorithm which substantially monitors the currently determined results of the first filter and can also monitor and, if necessary, correct them on the basis of previously and currently captured data, in particular. It is therefore advantageous if an additional memory for storing the previously captured data is provided.

It is also advantageous if the localization results corrected by the second filter are input back into the first filter as a basis for recursively calculating subsequent localization results. In other words, this means that the first filter, with its outputs, can be provided with feedback via a second filter. The localization results can therefore be determined more precisely taking into account uncertainties which have a normal distribution and/or uncertainties which do not have a normal distribution.

The described method makes it possible to advantageously detect the presence of interference, for instance multi-path reception or spoofing of GNSS signals, in good time and/or in a precise manner. In particular, the errors associated with this, in particular positioning errors, can be at least partially corrected. This advantageously makes it possible to avoid, for example, a sudden change in the direction of travel during automated or autonomous driving, in particular, or other dangerous driving scenarios.

It is preferred if the second filter additionally reads in INS data and takes them into account in the analysis according to step c). In this case, the INS data are, in particular, acceleration data and/or rate-of-rotation data which are previously and/or currently captured, in particular. The captured acceleration data in the direction of the longitudinal axis may be relevant to estimating the speed, for example. The captured rate-of-rotation data about the vertical axis (for example steering angle) may be relevant to estimating the position and/or orientation. It is preferred if the previously and/or currently captured INS data are stored, together with the localization results determined in step a), in the memory. The INS data and the localization results determined in step a) can therefore be read in together from the memory by the second filter and can be used as a basis for monitoring and, if necessary, correcting the localization results determined at a later time.

It is preferred if the first filter is a Kalman filter. In this case, an extended Kalman filter (EKF) or a cubature Kalman filter (CKF), for example, can be used to estimate the localization results, in particular to estimate the position, orientation and/or speed of the vehicle, usually on the basis of the currently captured GNSS and INS data.

It is preferred if the second filter is a particle filter.

It is preferred, in particular, if the second filter also estimates localization results and compares them with stored localization results.

In contrast to the Kalman filter, the particle filter may recursively re-estimate, in particular, the determined localization results at the current time by resampling previously determined localization results taking into account predefinable resampling criteria. The deviation between the estimated localization results and the actual localization results can therefore be advantageously recursively minimized. It is particularly advantageous for the particle filter to also be able to estimate the localization results taking into account uncertainties which do not have a normal distribution, for example multi-path reception and/or GNSS spoofing. The localization results which are determined in step a) and are possibly incorrect may therefore be advantageously monitored and, if necessary, at least partially corrected by means of the particle filter.

In particular, if the INS data which have been read in do not change significantly, but the localization results of the second filter differ from the localization results determined by the first filter, there is a high probability of multi-path effects or errors of the GNSS system.

In this case, the INS data which have been read in can be used as the above-mentioned resampling criteria for input variables of the particle filter. For example, if a steering angle does not change significantly before and at the current time, this means that the direction of travel has not been changed. Therefore, the positions determined in step a) should form a straight line in the last seconds, for example in the last 20 seconds. If the positions are further away from the line, this means that there may be interference in the positioning and these determined positions may be incorrect. In this case, only the positions which are on the line can be used to determine the subsequent positions.

In addition, the detected acceleration can be used as resampling criteria for input variables of the particle filter. For example, if the acceleration does not change significantly in the last seconds, the direction of the speed vectors determined in the meantime should likewise not be changed. If the direction of the speed vectors changes significantly, there may be interference and the speed vectors with a significantly changed direction may be incorrect. In this respect, the speed vectors in the last seconds with a direction which has not changed can be used to determine the subsequent localization results.

In addition, the captured angle of rotation about the respective axes can be used as resampling criteria for input variables of the particle filter. If, for example, the angle of rotation does not change significantly in the last seconds, the pose should accordingly not change in the meantime. If the determined poses differ significantly from one another in the last seconds, there may be interference. In this respect, most identical poses can be used to determine the subsequent localization results. The other poses can be considered to be incorrect poses.

It is also preferred for the second filter to detect interference if the analysis of the localization results reveals a driving behavior which does not match a driving behavior which results from INS (raw) data. This may be determined by the second filter, for example in the form of a comparison.

If, for example, the INS data reveal that the course (orientation of the vehicle in the longitudinal direction) was or is substantially constant, for example by reading in a course rate or change of course below a threshold value, the associated localization results should reveal a driving behavior in which a (GNSS-based) vehicle orientation from an (instantaneous) localization result corresponds substantially to the vehicle orientation from a (directly) preceding localization result.

If, for example, the INS data reveal that the acceleration was or is substantially constant, for example by reading in an acceleration change below a threshold value, the associated localization results should reveal a driving behavior in which a (GNSS-based) vehicle speed from an (instantaneous) localization result corresponds substantially to the vehicle speed from a (directly) preceding localization result.

If, for example, the INS data reveal that the location was or is substantially constant, for example by reading in a location rate or location change below a threshold value, the associated localization results should reveal a driving behavior in which a (GNSS-based) vehicle location from an (instantaneous) localization result corresponds substantially to the vehicle location from a (directly) preceding localization result.

It is preferred if localization results for which interference is detected are deleted, adapted or downweighted. The above-described incorrect positions, speed vectors and/or orientations (poses) can be deleted, adapted or downweighted.

It is also preferred if a computer program is used to carry out a method described here. In other words, this relates, in particular, to a computer program (product) comprising instructions which, when the program is executed by a computer, cause the latter to carry out a method described here.

It is also preferred to use a machine-readable storage medium on which the computer program proposed here is stored. The machine-readable storage medium is usually a computer-readable data storage medium.

It is preferred, in particular, if the localization system for a vehicle is configured to carry out a method described here.

The details, features and advantageous configurations discussed in connection with the method can accordingly also arise in the computer program presented here and/or the storage medium and/or the localization device and vice versa. In this respect, reference is made in full to the statements made there for more precise characterization of the features.

BRIEF DESCRIPTION OF THE DRAWINGS

The solution presented here and its technical environment are explained in more detail below with reference to the figures. It should be pointed out that the disclosure is not intended to be restricted by the exemplary embodiments shown. In particular, unless explicitly described otherwise, it is also possible to extract partial aspects of the substantive matter explained in the figures and to combine them with other elements and/or knowledge from other figures and/or the present description. Schematically.

DETAILED DESCRIPTION

Figure 1:
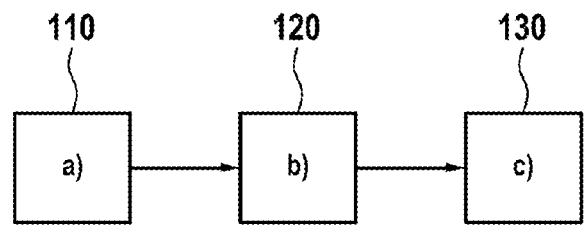
FIG. 1 shows a sequence of a method presented here for detecting the presence of interference during GNSS-based and INS-based localization of a vehicle during a normal operating sequence.

FIG. 1 schematically shows a sequence of a method presented here for detecting the presence of interference during GNSS-based and INS-based localization of a vehicle during a normal operating sequence. The illustrated order of method steps a), b) and c) with the blocks 110, 120 and 130 is only exemplary.

In block 110, localization results are determined by means of a first filter which reads in GNSS data and INS data. In block 120, a plurality of localization results which are after one another in terms of time and are each determined according to step a) are stored. In block 130, localization results stored in step b) are analyzed by means of a second filter which differs from the first filter.

Figure 2:
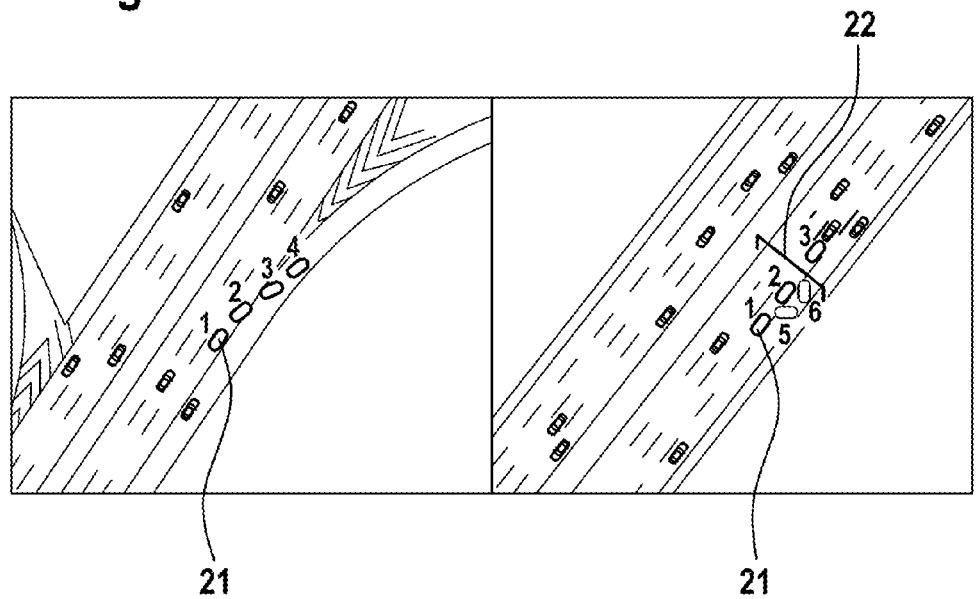
FIG. 2 shows two exemplary scenarios in the case of multi-path reception of GNSS signals.

FIG. 2 shows two typical driving scenarios with multi-path reception of GNSS signals, specifically a lane change which is too late (on the left) and a sudden change in the direction of travel (on the right).

It can be seen in FIG. 2 that a vehicle 21 (on the right) drives under an overhead sign 22. In this scenario, a GNSS signal may be reflected by the overhead sign 22 and the reflected signal is received in this manner by the GNSS antenna of the vehicle 21. In such a scenario, the multi-path propagation of the GNSS signal results in incorrect positioning, with the result that the vehicle 21 being navigated can suddenly change its direction of travel. FIG. 2 shows this sudden change in the direction of travel on the right, in the case of which position 1, position 2 and position 3 are intended to be the TARGET positions. However, position 5 and position 6, as the ACTUAL positions, differ on account of the multi-path reception.

Figure 3:
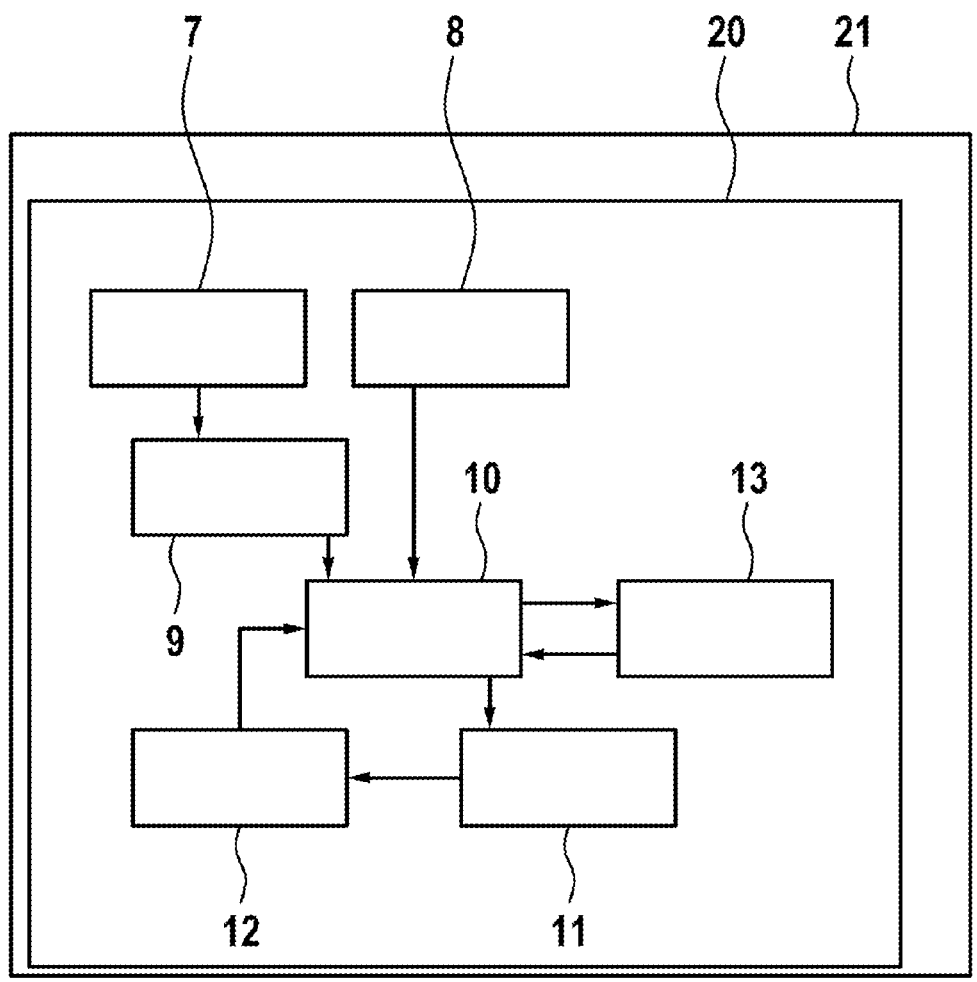
FIG. 3 shows an exemplary block diagram of a localization device for carrying out a method presented here.

FIG. 3 schematically shows an exemplary block diagram of a localization device 20 for carrying out a method presented here. The localization device 20 is arranged, for example, in a vehicle 21. The localization device 20 comprises a GNSS signal module 7 for capturing GNSS signals, an INS signal module 8 for capturing INS signals, a satellite status computer module 9 for determining satellite position information and time information contained in the GNSS signals, a navigation computer module 10 with a first filter (not shown) for determining localization results, a memory 11 for storing the determined localization results such as positions, speeds, orientations and times, an error detection module 12 with a second filter (not shown) for the improved detection of errors and for correcting the determined localization results, and a carrier phase fuzziness computer module 13 for analyzing carrier phases.

It can be seen in FIG. 3 that an additional memory 11 and an additional error detection module 12 are assigned to the localization device 20 and provide the navigation computer module 10 with feedback. Therefore, the localization results determined by the navigation computer module 10, such as positions, speeds, orientations and times, can be separately stored in the additional memory 11. The error detection module 12 with the second filter (not shown) reads in the determined localization results in the last seconds (for example in the last twenty seconds) from the memory 11 and inputs the corrected localization results to the error detection module 12. The error detection module 12 can determine new localization results on the basis of the corrected localization results.

Figure 4:
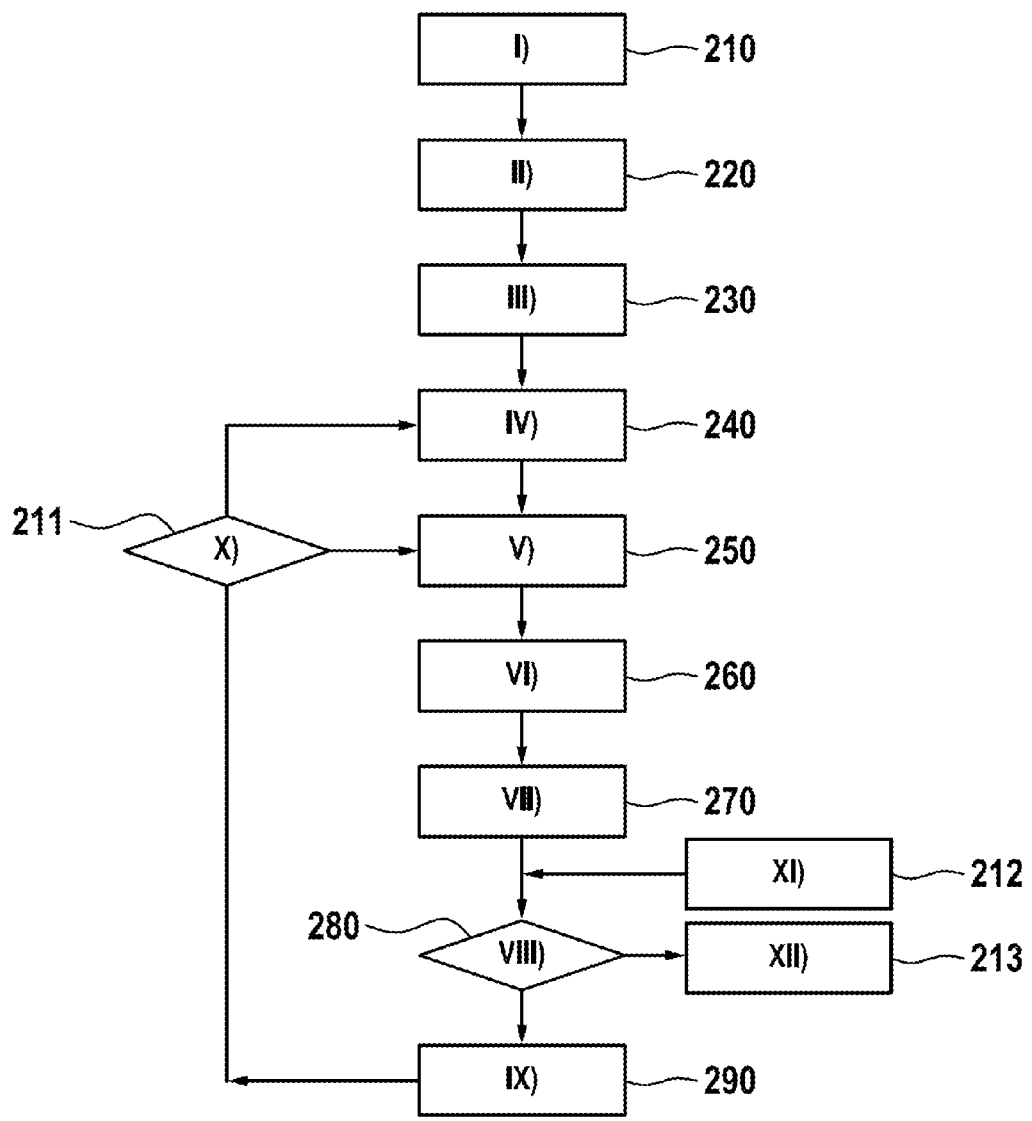
FIG. 4 shows an exemplary flowchart for carrying out a method presented here.

FIG. 4 shows an exemplary flowchart for carrying out a method presented here.

The illustrated order of steps I) to XII) with the blocks 210 to 212 is only exemplary. In block 210, a particle filter is created. In block 220, parameters of a non-linear system for estimating system states (for example localization results) are specified. In block 230, particles are initialized. In block 240, particles are sampled. In block 250, next system states are estimated. In block 260, measured values, for example GNSS and INS data, are captured. In block 270, estimated system states are corrected on the basis of the captured measured values (for example GNSS and INS data). In block 280, it is detected whether there is interference. In block 290, the most possible estimated system states are extracted if there is no interference. In block 211, particles are recursively resampled in order to estimate system states.

It can be seen in FIG. 4 that additional raw data (for example INS raw data), which are previously captured and stored in an additional memory (not shown), are read in in block 212 before interference is detected in block 280. In addition, intermediate results are deleted in block 213 if it is detected in block 212 that there is interference.

What is claimed is:

1. A method for detecting a presence of interference during global navigation satellite system (GNSS)-based and inertial sensor signals (INS)-based localization of a vehicle, comprising:
    determining localization results using a first filter configured to read in GNSS data and INS data;
    storing a plurality of the determined localization results, wherein the plurality of the determined localization results are after one another in terms of time and are each determined using the first filter;
    reading in INS data using a second filter, the second filter different from the first filter;
    analyzing the stored plurality of localization results using the second filter based on the INS data to detect the presence of interference and to correct the determined localization results; and
    operating the vehicle based on the corrected localization results to avoid sudden localization changes of the vehicle due to the detected presence of interference.

2. The method according to claim 1, wherein the first filter is a Kalman filter.

3. The method according to claim 2, wherein the second filter is a particle filter.

4. The method according to claim 1, wherein the second filter is configured to detect the presence of interference when the analysis of the stored plurality of localization results reveals a driving behavior which does not match a driving behavior which results from the INS data.

5. The method according to claim 4, wherein localization results of the stored plurality of localization results for which the presence of interference is detected are deleted, adapted, or downweighted.

6. The method according to claim 1, wherein a computer program is configured to carry out the method.

7. The method according to claim 6, wherein the computer program is stored on a non-transitory machine-readable storage medium.

8. A method for detecting a presence of interference during global navigation satellite system (GNSS)-based and inertial sensor signals (INS)-based localization of a vehicle, comprising:
    determining localization results using a first filter configured to read in GNSS data and INS data;
    storing a plurality of the determined localization results, wherein the plurality of the determined localization results are after one another in terms of time and are each determined using the first filter; and
    analyzing the stored plurality of localization results using a second filter which differs from the first filter,
    wherein the second filter is configured to estimate localization results and to compare the estimated localization results with the stored plurality of localization results to detect the presence of interference and to correct the determined localization results, and
    wherein the vehicle is operated based on the corrected localization results to avoid sudden localization changes due to the detected presence of interference.

9. A localization device for a vehicle, comprising:
    a first filter configured to read in global navigation satellite system (GNSS) data and inertial sensor signals (INS) data, the first filter further configured to determine localization results based on the GNSS data and the INS data, wherein a plurality of the determined localization results are stored, and wherein the plurality of determined localization results are after one another in terms of time and are each determined using the first filter; and a second filter different from the first filter, the second filter configured to read in the INS data and to analyze the stored plurality of localization results based on the INS data (i) to detect a presence of interference during GNSS-based localization of the vehicle, and (ii) to correct the determined localization results during INS-based localization of the vehicle.

10. The localization device according to claim 9, wherein the first filter is a Kalman filter.

11. The localization device according to claim 10, wherein the second filter is a particle filter.

12. The localization device according to claim 9, wherein the second filter is configured to detect the presence of interference when the analysis of the stored plurality of localization results reveals a driving behavior which does not match a driving behavior which results from the INS data.

13. The localization device according to claim 12, wherein localization results of the stored plurality of localization results for which the presence of interference is detected are deleted, adapted, or downweighted.

\* \* \* \* \*